United States Patent Office 3,508,963
Patented Apr. 28, 1970

3,508,963
RESIN-COATED ELECTRIC WIRE
Hiroshi Izumi, Toyama-shi, Tomonori Sengoku, Namerikawa-shi, and Sumio Igarashi and Kosaku Kamio, Uozushi, Japan, assignors to Nippon Carbide Kogyo Kabushiki Kaisha, Tokyo, Japan
No Drawing. Filed July 7, 1967, Ser. No. 651,710
Claims priority, application Japan, July 12, 1966,
41/45,056
Int. Cl. B44c 1/36; H01b 3/44
U.S. Cl. 117—232      4 Claims

ABSTRACT OF THE DISCLOSURE

The present invention provides an electric wire (herein the term "wire" includes cables) coated with a resin composition comprising a vinyl chloride containing 13–40% by weight of a monoolefin not higher than $C_4$, preferably ethylene. This resin-coated wire is much improved in properties such as flexibility, insulation resistance, weather resistance, heat resistance and aging resistance, compared with the conventional one coated with polyvinyl chloride resin composition.

---

This invention relates to a resin-coated electric wire, more particularly to a wire coated with vinyl chloride/monoolefin copolymer composition, which is much improved in properties such as flexibility, insulation resistance, weather resistance, heat resistance and aging resistance, compared with the conventional one coated with polyvniyl chloride resin composition.

The conventional wire coated with polyvinyl chloride resin composition is excellent in some properties such as workability, resistances to flaming, oils and chemicals, but not satisfactory in other some properties required for coated electric wires. First of all, generally for coated wires, are required high flexibility and high insulation resistance at the same time. However, the conventional polyvinyl chloride coated wire has a serious defect that if flexibility is high, insulation resistance is low and on the contrary if insulation resistance is high, flexibility is low. Particularly, vinyl chloride homopolymer itself has a high volume resistivity (ohm-cm.) of $10^{16}$ order, nevertheless upon application the resistivity is decreased to $10^{13}$ order because the homopolymer must be compounded with a large amount of plasticizer in order to impart flexibility. Further, the conventional polyvinyl chloride wire is not satisfactory in resistances to weather, heat and aging. As the result, the conventional wire has many disadvantages such that its allowable voltage range is limited (maximum 600 volts) and its allowable temperature range is also narrow (maximum 60° C.).

An object of the present invention is to provide a resin-coated electric wire having high flexibility and high insulation resistance at the same time.

Another object is to provide a resin-coated electric wire having improved resistances to weather, heat and aging.

The present invention provides an electric wire coated with a resin composition comprising a vinyl chloride copolymer containing from 13% to 40% by weight of a monoolefin having carbon atoms not more than 4.

In this application, the term "electric wire" means wires not only for low voltage but also for high voltage and cables; for example, 600 v. indoor and outdoor wires, flexible code, OW wire, DV wire, SV wire, vinyl captire cable, high voltage cable, control vinyl cable, signal vinyl cable, and vinyl sheath wires and cables.

The copolymer, the essential component of the resin composition used in the present invention, is generally prepared by copolymerizing vinyl chloride with a monoolefin not higher than $C_4$. The copolymerization may be ionic or radical type. When the copolymer is prepared by radical copolymerization, there can be adopted a polymerization process using water as medium, such as emulsion or suspension polymerization, and the preparation is very convenient.

The monoolefin to be contained in the copolymer is one or more of ethylene, propylene, butene-1, butene-2, and isobutene. Among these monoolefins, ethylene is most preferably used, because it is inexpensive and convenient to be copolymerized and further the properties of the resultant copolymer are excellent.

If the monoolefin content in the copolymer is less than 13% by weight, such a sufficient flexibility as passing the standard of JIS-C-3307 defining winding property at low temperature cannot be obtained. On the other hand, if more than 40% by weight, the tensile strength is so poor as not capable of standing practical applications. Preferred contents are 16–30% by weight.

The other components of the resin composition used in the present invention are agents well known in this field, including stabilizers (0.5–10 phr.) (herein phr. means per hundred resin copolymer by weight) such as dibasic lead phosphite and tribasic lead sulfate; lubricants (0.2–2.0 phr.) such as butyl stearate, mineral oil and low molecular weight polyethylene; antioxidants (0.05–0.3 phr.) such as triphenyl phosphite and Bisphenol A; ultraviolet absorbers (0.05–0.3 phr.) such as benzophenone derivatives and benzotriazole derivatives; fillers (0–70 phr.) such as calcium carbonate and barium sulfate; and pigments (0.0001–3.0 phr.) such as $T_iO_2$ and Phthalocyanine Blue. Resinous polymers or copolymers other than the present copolymer may be compounded in such a small proportion as not departing from the spirit of the present invention.

In the present invention, it is especially preferable that 0.5–3 phr. of dibasic lead phosphite are compounded as stabilizer. Though it is known that dibasic lead phosphite improves weather resistance of polyvinyl chloride resin composition, we have found that it improves not only weather resistance but also heat resistance for the vinyl chloride/monoolefin copolymer resin composition of the present invention as shown in the following.

| Composition (parts by weight) | A | B |
|---|---|---|
| Vinyl chloride/ethylene copolymer (ethylene content 21.9 weight percent) | 100 | 100 |
| Tribasic lead sulfate | 6.0 | 4.5 |
| Dibasic lead phosphite | 0 | 1.5 |
| Lead stearate | 1.5 | 1.5 |

| | Elongation residual ratio (percent) [1] | |
|---|---|---|
| Heat temperature | A | B |
| 140° C | 83.5 | 94.3 |
| 150° C | 69.5 | 87.1 |
| 160° C | 32.3 | 82.5 |

[1] After heating for 120 hours.

The electric wire of the present invention can be produced by using well known equipments for producing the conventional wire coated with polyvinyl chloride resin composition.

Comparing the conventional polyvinyl chloride coated wire, the electric wire of the present invention is much improved in flexibility and insulation resistance. Thus the latter has a high flexibility and a high insulation resistance at the same time. The latter's insulation resistance is ten or more times as high as the former's.

The latter, the present wire, is improved in weather resistance also. The latter's life reaches twice as long as the former's.

Further, the latter is improved in resistances to heat and aging. The latter's allowable temperature is higher than the former's by 30° C. or more.

Further, dielectric constant of the present composition, e.g. 3.21 ($10^6$ c./s.), is much lower than the conventional polyvinyl chloride composition's, e.g. 6.2–7 ($10^6$ c./s.). Also dielectric dissipation factor of the present composition is 1/6 or less times as low as the conventional composition's.

Accordingly, the electric wire of the present invention can be used not only in the applications of the conventional polyvinyl chloride coated wire but also in various applications of much higher voltages for which the conventional one can not be used.

Furthermore, we have found that a calcined kaolin clay such as Kaolin Clay No. 33 (Southern Clays Inc.) or Burgess Pigment No. 30 is surprisingly effective as insulation improving agent for our vinyl chloride/monoolefin composition. Its amount is 1–70 phr., preferably 3–30 phr.

Also in the past, a calcined kaolin clay has been used as insulation improving agent for polyvinyl chloride coated wires. However, the effect is only such that the volume resistivity is increased from $10^{12}$ order to $10^{13}$ order when 10 or more phr. of calcined kaolin clay are used.

On the other hand, in the present invention, the volume resistivity is increased from $10^{13}$ order to $10^{15}$ order when 10–20 phr. of calcined kaolin clay are used, and for an increase of $10^1$ order in volume resistivity, such a small amount of clay as 3 phr. is sufficient.

EXAMPLES 1–3, REFERENCE EXAMPLES 1–4

Preparation of copolymer

Vinyl chloride/ethylene copolymers were prepared using 200-liters stainless steel autoclaves and according to the following specifications.

| Example | 1 | 2 | 3 |
|---|---|---|---|
| Water, liters | 80 | 64 | 64 |
| Methanol, liters | 0 | 16 | 16 |
| Catalyst | [1] APS | APS | APS |
| Catalyst amount, grams | 100.8 | 50.4 | 50.4 |
| Emulsifier | [2] DBS | DBS | DBS |
| Emulsifier amount, grams | 160 | 160 | 160 |
| Reducing agent | $Na_2SO_3$ | $Na_2SO_3$ | $Na_2SO_3$ |
| Reducing agent amount, grams | 55.8 | 28.0 | 28.0 |
| Vinyl chloride, kg | 17 | 10 | 10 |
| Polymerization pressure, kg./cm.$^2$ | 40 | 40 | 60 |
| Polymerization temperature, ° C. | 18 | 10 | 10 |
| Polymerization time, hours | 20 | 20 | 25 |
| Yield, kg | 18.5 | 9.5 | 8.4 |
| Specific viscosity [3] | 0.330 | 0.351 | 0.269 |
| Ethylene content | 17.8 | 20.9 | 25.5 |

[1] APS = ammonium persulfate.
[2] DBS = sodium dodecylbenzenesulfonate.
[3] Specific viscosity = polymer 4 g./l. cyclohexanon at 30° C.

Water and methanol are charged into the autoclave and then a mixture of 1/3 of catalyst and all of emulsifier are added. After flushing the autoclave with oxygen-free nitrogen, vinyl chloride is introduced and then ethylene is pressed thereinto until the predetermined pressure is obtained. One third of reducing agent is added and copolymerization is conducted at the predetermined temperature. During polymerization, the pressure is maintained at constant with allowance of ±0.5 kg./cm.$^2$ by withdrawing continuously ethylene from the autoclave by use of an automatic pressure controlling valve, the pressure otherwise rising gradually as the reaction proceeds. The remaining portions of catalyst and reducing agent are added dividedly during polymerization. After the predetermined time, unreacted monomers are removed.

Preparation of compound

The following components were compounded to prepare compounds.

| | Parts by weight |
|---|---|
| The above copolymer | 100 |
| Tribasic lead sulfate | 3.5 |
| Dibasic lead phosphite | 1.5 |
| Lead stearate | 1.0 |
| Butyl stearate | 0.5 |

Determination of stiffness modulus

Press sheets (2 mm. thickness) were made of the above compounds according to the following conditions and their stiffness moduli were determined according to ASTM–D–1043–51T.

Blender—two rolls (8"$\phi$ x 20").
Blending time—10 min.
Blending temperature—120° C.
Pressing temperature—160° C.
Pressing time—10 min.
Pressing pressure—35 kg./cm.$^2$.

Determination of insulation resistance

The same compounds were kneaded at 100° C. for 1 hour with a ribbon blender and then coated wires were prepared according to the following conditions:

Extruder—40 mm.
Extruder temperature, ° C.:
 Back cylinder—150.
 Front cylinder—170.
 Head—160.
Die temperature—160° C.
Screen:
 80 mesh—one.
 100 mesh—one.
Conductor—soft copper wire.
Conductor diameter—1 mm.
Vinyl coat thickness—0.8 mm.

Insulation resistances of coated wires thus obtained were determined according to JIS–C–3307.

COMPARATIVE TESTS (REFERENCE EXAMPLES)

For comparison, vinyl chloride homopolymers were compounded with plasticizer, and the stiffness moduli and insulation resistances were determined as above.

TEST RESULTS

| | Ex. 1 | Ex. 2 | REx. 1 | REx. 2 | Ex. 3 | REx. 3 | REx. [3] |
|---|---|---|---|---|---|---|---|
| Plasticizer (DOP), phr | 0 | 0 | 40 | 50 | 0 | 30 | 14 |
| Insulation resistance, M-ohm/km | $4.68 \times 10^3$ | $1.99 \times 10^3$ | $1.7 \times 10^2$ | $4.4 \times 10$ | $6.25 \times 10^2$ | $6.12 \times 10^2$ | $4.68 \times 10^7$ |
| Stiffness modulus, kg./mm.$^2$ | 6.17 | 4.60 | 6.22 | 4.56 | 3.36 | 8.25 | 41.38 |

As apparent from the comparison of Ex. 1 with REx. 1 or Ex. 2 with REx. 2, the electric wire of the present invention has much improved insulation resistance of 40 times as high as the conventional one, with substantially equal flexibility.

Further, as apparent from the comparison of Ex. 3 with REx. 3 or Ex. 1 with REx. 4, the conventional wire having insulation resistance substantially equal to Ex. 3 or Ex. 1 has no flexibility and can not pass the electric wire standard JIS–C–3307.

In short, the electric wire of the present invention has a high flexibility and a high insulation resistance at the same time, differently from the conventional one.

EXAMPLES 4–8, REFERENCE EXAMPLES 5–6

Vinyl chloride/ethylene copolymers having different ethylene contents were prepared as in Example 1 but polymerization temperature 10–20° C., polymerization pressure 30–130 kg./cm.$^2$ and vinyl chloride feed varied from 20 to 8 kg.

The copolymers were compounded with 10 phr. of Kaolin Clay No. 33 (Southern Clays Inc.), 4 phr. of tribasic lead sulfate, 1.5 phr. of dibasic lead phosphite and 0.5 phr. of A. C. Polyethylene 6A (Allied Chemical Corp.).

Using the compounds, coated wires were prepared as in Example 1 and insulation resistance, winding test, elongation after heating and tensile strength at normal temperature were determined according to JIS-C-3307. The results obtained are shown in the following table.

As apparent from the results, the wire of the present invention has remarkably improved heat resistance and insulation resistance.

40% and specific viscosity is less than 0.2, properties are very inferior.

It is apparent from data of brittleness temperature that the electric wire of the present invention is also excellent in resistance to coldness.

EXAMPLE 14, REFERENCE EXAMPLES 9–10

Vinyl chloride/ethylene copolymer having ethylene content of 19.4% and specific viscosity of 6.395 was prepared as in Example 1.

The copolymer was compounded with 2.5 phr. of tribasic lead sulfate, 1.0 phr. of dibasic lead phosphite and 0.5 phr. of butyl stearate.

Using this compound, a coated wire having outer diameter of 2.6 mm. was prepared and weathering test was made according to the following conditions:

Test machine—twin carbon arc weather-o-meter
Test temperature—black panel temp. 60° C.
Water spray—18 min./in. 120 min.
Determinations—according to JIS-C-3307.

Irradiation time and elongation residual ratio are shown in the following table.

|  | Ethylene content, percent | Specific viscosity | Insulation resistance M-ohm/km. | Winding test at low temperature | Elongation after heating, percent | | Tensile strength at normal temperature, kg./mm.$^2$ | Flammability |
|---|---|---|---|---|---|---|---|---|
|  |  |  |  |  | 120° C. | 140° C. |  |  |
| REx. 5 | 12.5 | 0.452 | 2.56×10$^4$ | Bad | 95 | 96 | 2.91 | Selfextinguishing. |
| Ex. 4 | 16.3 | 0.417 | 4.32×10$^4$ | Good | 98 | 94 | 2.56 | Do. |
| Ex. 5 | 18.9 | 0.392 | 2.71×10$^4$ | ...do | 97 | 95 | 2.25 | Do. |
| Ex. 6 | 23.6 | 0.371 | 1.49×10$^4$ | ...do | 96 | 92 | 1.96 | Do. |
| Ex. 7 | 32.8 | 0.251 | 1.99×10$^3$ | ...do | 98 | 93 | 1.43 | Do. |
| Ex. 8 | 37.1 | 0.213 | 4.88×10$^2$ | ...do | 95 | 91 | 1.21 | Do. |
| REx. 6 | 42.2 | 0.172 | 6.01×10 | ...do | 96 | 86 | 0.78 | Do. |

Further, using the above compounds, sheets of 2 mm. in thickness were prepared as in Example 1, and stiffness moduli were determined as in Example 1 and volume resistivities were determined according to JIS-K-6723.

|  | Ethylene content, percent | Stiffness modulus, kg./mm.$^2$ | Volume resistivity, ohm-cm. |
|---|---|---|---|
| REx. 5 | 12.5 | 21.25 | 4.5×10$^{15}$ |
| Ex. 4 | 16.3 | 7.44 | 6.2×10$^{15}$ |
| Ex. 5 | 18.9 | 5.91 | 3.6×10$^{15}$ |
| Ex. 6 | 23.6 | 3.72 | 1.9×10$^{15}$ |
| Ex. 7 | 32.8 | 3.01 | 2.5×10$^{14}$ |
| Ex. 8 | 37.1 | 2.80 | 6.9×10$^{13}$ |
| REx. 6 | 42.2 | 2.16 | 9.6×10$^{12}$ |

EXAMPLES 9–13, REFERENCE EXAMPLES 7–8

Preparing compounds corresponding to the above compounds used in Ex. 4–8 and REx. 5–6 but free of Kaolin Clay No. 33 respectively, their properties were determined.

For comparison, similar compounds but comprising vinyl chloride homopolymer plus 50 phr. of DOP or polyethylene in place of the vinyl chloride/ethylene copolymer were tested (Reference Examples 9 and 10).

| Irradiation time, hours | Ex. 14, percent | REx. 9, percent | REx. 10,[1] percent |
|---|---|---|---|
| 400 | 97.8 | 96.4 | 0.5 |
| 800 | 95.6 | 72.5 |  |
| 1,200 | 86.7 | 12.2 |  |
| 1,600 | 69.6 | 1.3 |  |

[1] Low density polyethylene Melt Index 4.0 natural.

As apparent from the above, the wire of the present invention is much improved in weather resistance.

EXAMPLE 15 REFERENCE EXAMPLE 11

Using the wire of Example 5, elongation residual ratio were examined after heating at various temperatures for 120 hours.

|  | Polymer | | Properties | | |
|---|---|---|---|---|---|
|  | Ethylene content, percent | Specific viscosity ($\eta$) | Stiffness modulus, kg./mm.$^2$ | Volume resistivity, ohm/cm. | Brittleness temperature, ° C.[1] |
| REx. 7 | 12.5 | 0.452 | 19.41 | 8.2×10$^{14}$ | −14.5 |
| Ex. 9 | 16.3 | 0.416 | 7.23 | 6.4×10$^{14}$ | −30.6 |
| Ex. 10 | 18.9 | 0.392 | 5.64 | 3.6×10$^{14}$ | −35.3 |
| Ex. 11 | 23.6 | 0.371 | 3.61 | 1.9×10$^{14}$ | −42.5 |
| Ex. 12 | 32.8 | 0.251 | 2.93 | 4.9×10$^{13}$ | ([2]) |
| Ex. 13 | 37.1 | 0.213 | 2.71 | 8.9×10$^{12}$ | −39.5 |
| REx. 8 | 42.2 | 0.172 | 2.0 | 4.2×10$^{11}$ | −20.5 |

[1] Brittleness temperature is determined according to ASTM-D-746-55T.
[2] Minus 50° C. or lower.

As apparent from the above Ex. 4–13 and REx. 5–8, effective ethylene contents are not less than 13%, preferably not less than 16%. When ethylene content is over For comparison, a similar compound as in Example 5 but comprising 100 parts of vinyl chloride homopolymer plus 50 parts of N-dioctyl phthalate in place of vinyl chloride/ethylene copolymer was tested (Reference Example 11).

| Heating temperature | Ex. 15, percent | REx. 11, percent |
|---|---|---|
| 120° C | 97 | 87 |
| 140° C | 95 | 58 |
| 160° C | 83 | 42 |

As apparent from the above, the wire of the present invention is improved in heat resistance by 30° C. or more, compared with the conventional polyvinyl chloride coated wire.

EXAMPLE 16, REFERENCE EXAMPLE 12

With the sheet of Example 10, dielectric constant and dielectric dissipation factor were determined at 20° C. (Example 16).

For comparison, a sheet made of a similar composition as in Example 10 but comprising 100 parts of vinyl chloride homopolymer plus 50 parts of N-dioctyl phthalate in place of vinyl chloride/ethylene copolymer was stirred (Reference Example 12).

|  | Ex. 16 | REx. 12 |
|---|---|---|
| Dielectric constant | 3.26 | 6.13 |
| Dielectric dissipation facto2r | 0.011 | 0.07 |

As apparent from the above, the wire of the present is remarkably improved in dielectric constant and dielectric dissipation factor.

EXAMPLES 17–26, REFERENCE EXAMPLES 13–22

To 100 parts of vinyl chloride/ethylene copolymer having ethylene content of 19.7%, were added 4 parts of tribasic lead sulfate, 1.5 parts of diabasic lead phosphite, 0.5 parts of A. C. polyethylene 6A (Allied Chemical Inc.) and kaolin clay in amount of 0, 1, 3, 5, 10, 15, 20, 30, 50, 70 parts respectively and the mixture was kneaded in 8" φ x 20" roll at 120° C. for 10 minutes to make sheets of 0.53 mm. thickness. Each four of the above sheets were laminated and pressed at 160° C. for 10 minutes to make a sheet of 2 mm. thickness. With the respective sheet, volume resistivity was determined according to JIS-K-6723 and stiffness modulus according to ASTM-D-1023 (Examples 17–26).

For comparison, also with similar compounds as above but comprising 100 parts of vinyl chloride homopolymer plus 50 parts of N-dioctyl phthalate in place of vinyl chloride/ethylene copolymer, the same tests were made (Reference Examples 13–22).

| Ex. No. | Kaolin clay, phr. | Volume resistivity, ohm-cm. | Stiffness modulus, kg./mm. |
|---|---|---|---|
| 17 | 0 | $4.4 \times 10^{13}$ | 4.49 |
| 18 | 1 | $7.6 \times 10^{13}$ | 4.45 |
| 19 | 3 | $5.7 \times 10^{14}$ | 4.47 |
| 20 | 5 | $1.0 \times 10^{15}$ | 5.37 |
| 21 | 10 | $4.1 \times 10^{15}$ | 5.94 |
| 22 | 15 | $2.8 \times 10^{15}$ | 6.22 |
| 23 | 20 | $5.1 \times 10^{15}$ | 6.68 |
| 24 | 30 | $2.5 \times 10^{15}$ | 7.71 |
| 25 | 50 | $6.8 \times 10^{14}$ | 7.66 |
| 26 | 70 | $2.1 \times 10^{14}$ | 8.59 |

| Re. Ex. No. | Kaolin clay, phr. | Volume resistivity, ohm-cm. | Stiffness modulus, kg./mm.² |
|---|---|---|---|
| 13 | 0 | $6.2 \times 10^{12}$ | 4.31 |
| 14 | 1 | $6.4 \times 10^{12}$ | 4.33 |
| 15 | 3 | $8.5 \times 10^{12}$ | 4.42 |
| 16 | 5 | $2.1 \times 10^{13}$ | 4.46 |
| 17 | 10 | $5.2 \times 10^{13}$ | 4.55 |
| 18 | 15 | $7.9 \times 10^{13}$ | 4.77 |
| 19 | 20 | $9.4 \times 10^{13}$ | 4.83 |
| 20 | 30 | $7.5 \times 10^{13}$ | 5.25 |
| 21 | 50 | $3.8 \times 10^{13}$ | 7.18 |
| 22 | 70 | $9.7 \times 10^{12}$ | 9.84 |

EXAMPLE 27

A wire was prepared as in Example 4, except that vinyl chloride/ethylene/propylene copolymer having ethylene content of 14.7% and propylene content of 2.5% was used in place of vinyl chloride/ethylene copolymer. Then the properties of the wire were determined in the same way as in Example 4. As the result, the insulation resistance was $3.96 \times 10^4$ M-ohm./km., the winding test at low temperature was good, the elongation after heating was 95% at 120° C. and 89% at 140° C. respectively, and the tensile strength at normal temperature was 2.15 kg./mm.²

What is claimed is:

1. An electric wire coated with a resin composition free of plasticizers which comprises 100 parts by weight of a vinyl chloride copolymer containing from 13 to 40% by weight of a monoolefin having up to 4 carbon atoms per molecule, from 0.5 to 3.0 parts by weight of dibasic lead phosphite and from 1 to 70 parts by weight of calcined kaolin clay.

2. The electric wire according to claim 1 wherein the monooelfin is ethylene.

3. The electric wire according to claim 1 wherein the content of monoolefin is from 16% to 30% by weight.

4. The electric wire according to claim 1 wherein the resin composition has a stiffness modulus lower than 9.0 kg./mm.² and a volume resistivity higher than $1 \times 10^{14}$ ohm./cm.

References Cited

UNITED STATES PATENTS

| 2,534,108 | 12/1950 | de Nie et al. | 260—87.5 |
| 2,713,563 | 7/1955 | Kuhn | 260—87.5 |
| 3,278,477 | 10/1966 | Evans. | |
| 2,674,585 | 4/1954 | Condo et al. | 260—87.5 |
| 2,674,593 | 4/1954 | Condo et al. | 260—87.5 |
| 2,689,836 | 9/1954 | Bier | 260—87.5 |
| 3,111,505 | 11/1963 | Rust et al. | 260—87.5 |
| 3,248,375 | 4/1966 | Erbaugh | 260—87.5 |
| 3,324,097 | 6/1967 | Pears | 260—87.5 |
| 3,373,150 | 3/1968 | Pears | 260—87.5 |
| 3,399,157 | 8/1968 | Deex et al. | 260—87.5 |

WILLIAM D. MARTIN, Primary Examiner

RAYMOND M. SPEER, Assistant Examiner

U. S. Cl. X.R.

117—128.4, 161